United States Patent [19]

Hards et al.

[11] Patent Number: 5,501,915
[45] Date of Patent: Mar. 26, 1996

[54] POROUS ELECTRODE FOR ELECTRODE ASSEMBLIES IN A FUEL CELL

[75] Inventors: Graham A. Hards, Wallingford; Thomas R. Ralph, Reading, both of United Kingdom

[73] Assignee: Johnson Matthey Public Limited Company, United Kingdom

[21] Appl. No.: 429,460

[22] Filed: Apr. 26, 1995

Related U.S. Application Data

[63] Continuation of Ser. No. 79,461, Jun. 18, 1993, abandoned.

[30] Foreign Application Priority Data

Jun. 20, 1992 [GB] United Kingdom ............... 9213124

[51] Int. Cl.$^6$ ............................... H01M 4/92; H01M 4/86
[52] U.S. Cl. .............................................. 429/42; 429/44
[58] Field of Search ........................................ 429/42, 44

[56] References Cited

U.S. PATENT DOCUMENTS

| | | | |
|---|---|---|---|
| 4,804,592 | 2/1989 | Vanderborgh et al. | 429/33 |
| 4,816,431 | 3/1989 | Furuya et al. | 502/101 |
| 4,876,115 | 10/1989 | Raistrick . | |
| 4,877,694 | 10/1989 | Solomon et al. . | |
| 5,084,144 | 1/1992 | Reddy et al. . | |

FOREIGN PATENT DOCUMENTS

| | | |
|---|---|---|
| 0241432A2 | 10/1987 | European Pat. Off. . |
| 0292431A2 | 11/1988 | European Pat. Off. . |
| 0483085A2 | 4/1992 | European Pat. Off. . |
| 9213124.2 | 9/1992 | United Kingdom . |
| WO88/06642 | 9/1988 | WIPO . |

OTHER PUBLICATIONS

M. S. Wilson and S. Gottesfield, "High Performance Catalyzed Membranes of Ultra–low Pt Loadings for Polymer Electrolyte Fuel Cells," *J. Electrochem. Soc.*, vol. 139, No. 2, Feb. 1992, pp. L28–L30.

E. J. Taylor, E. B. Anderson and N. R. K. Vilambi, "Preparation of High–Platinum–Utilization Gas Diffusion Electrodes for Proton–Exchange–Membrane Fuel Cells," *J. Electrochem. Soc.*, vol. 139, No. 5, May 1992, pp. L45–L46.

6001 Chemical Abstracts 115 (1991) Dec. 2, No. 22, Columbus, Ohio, US (one page) (no month).

Shukla, et al. "A Nafion–bound platinized carbon electrode for oxygen reduction in solid polymer electrolyte cells," *Journal of Applied Electrochemistry, 19* (1989) 383–386 (no month).

*Primary Examiner*—John S. Maples
*Attorney, Agent, or Firm*—Christie, Parker & Hale

[57] ABSTRACT

A porous electrode suitable for use in a membrane electrode assembly for solid polymer fuel cells comprises a highly dispersed precious metal catalyst on particulate carbon impregnated with proton conducting polymer, and, a further component comprising hydrophobic polymer and a dispersion of particulate carbon, the loading of precious metal being 0.011– 1.0 mg/cm$^2$ of geometric electrode area. Said electrode demonstrates high effective platinum surface area and power density output when fabricated into a membrane electrode assembly.

8 Claims, 2 Drawing Sheets

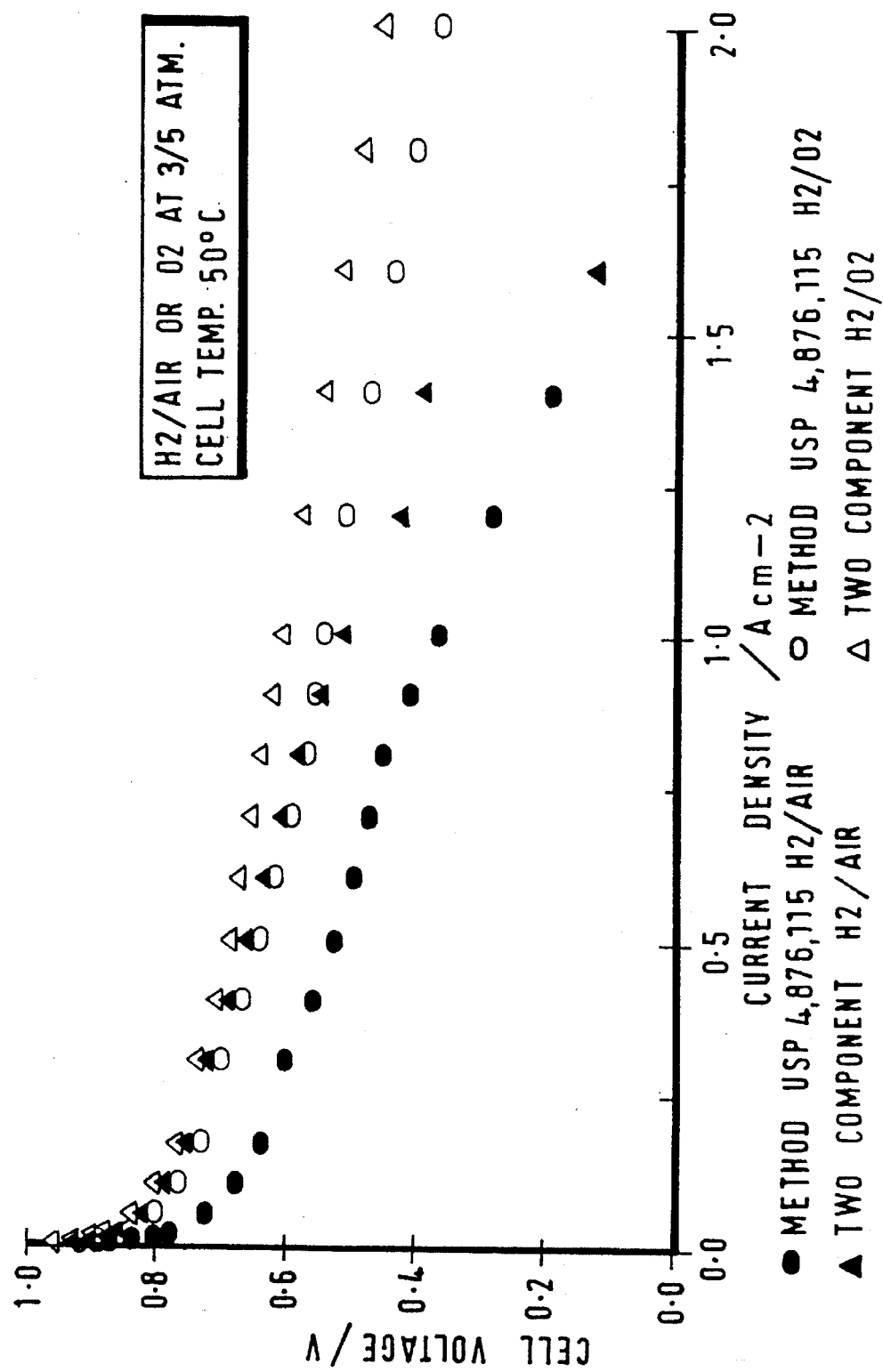

POROUS ELECTRODE FOR ELECTRODE ASSEMBLIES IN A FUEL CELL

CROSS-REFERENCE TO RELATED APPLICATION

This is a continuation of application Ser. No. 08/079,461, filed Jun. 18, 1993, now abandoned.

BACKGROUND OF THE INVENTION

This invention relates to electrode assemblies, and more particularly to electrode assemblies for use with fuel cells having solid polymer electrolytes.

Fuel cells in which the electrolyte is a solid polymer are known as solid polymer fuel cells, SPFCs, or proton exchange membrane fuel cells, PEMFCs. The solid proton-conducting polymer membrane electrolytes, commonly based on perfluorosulphonic acid materials, have to be maintained in a hydrated form during operation to prevent loss of ionic conduction through the electrolyte. This limits the operating temperature of the SPFC typically to between 80° C. and 120° C., depending on the operating pressure. Therefore, both the anode reaction, at which the fuel, which may be hydrogen, a hydrocarbon or an oxygen-containing fuel such as methanol, is oxidised, and the cathode reaction, at which oxygen is reduced, require catalysts to proceed at useful rates. Precious metals, and in particular platinum, have been found to be the most efficient and stable catalysts for all fuel cells which operate at below 300° C., regardless of whether the electrolyte is acidic or alkaline in nature, although they are particularly useful in acid electrolyte fuel cells such as the SPFC.

The phosphoric acid fuel cell (PAFC) is the type of acid electrolyte fuel cell closest to commercialisation, and will find applications in the multi-megawatt utility power generation market and also in combined heat and power systems in the 50 to several hundred kilowatt range. The SPFC however, can provide much higher power density output than the PAFC, and can operate efficiently at much lower temperatures. Because of this it is envisaged that the SPFC might find use in applications such as small scale residential power generation and in vehicular power generation. In particular, regulations have been passed in areas of the United States which may restrict the use of combustion engines in the future. SPFC demonstration units are being built for evaluation in these applications.

In the liquid electrolyte PAFC system the platinum electrocatalyst is provided as very small particles (20–50 Å diameter), of high surface area, which are distributed on, and supported by, larger conducting carbon particles to provide a desired catalytic loading. Electrodes are formed from the catalysed carbon particles and, for the fuel cell reactions to proceed efficiently, these electrodes are designed to optimise contact between the reactant gas, the electrolyte, and the precious metal electrocatalyst. The electrode has to be porous, and is often known as a gas diffusion (or gas porous) electrode, to allow the reactant gas to enter the electrode from the back and electrolyte to penetrate through from the front. Efficient gas diffusion electrodes, using platinum loadings of around 0.3–0.5 mg/cm$^2$ of geometrical electrode area, have been developed for fuel cells such as the PAFC, which use a liquid acid electrolyte. The electrolyte can penetrate that portion of the porous structure of the catalyst carbon support which contains the majority of the platinum catalyst, and in practice above 90% of the catalyst is effectively utilised to perform the fuel cell reactions.

In any fuel cell, the rates of the electrode reactions depend on a number of factors, but the most important is the total effective surface area of the catalyst present at the interface between the reactant gas and the electrolyte.

In the SPFC the electrodes are bonded to the solid polymer electrolyte, which is in the form of a thin membrane, to form a single integral unit, known as the membrane electrode assembly (MEA). It has been found that the supported catalyst gas diffusion electrodes, as developed for the PAFC, are in general unsuitable for use with SPFCs as only very low current densities are usually attainable. This is because very little of the platinum catalyst surface is present at the three-phase interface, where the membrane electrolyte is in direct contact with platinum catalyst surface and an adjacent gas pore. This occurs most readily at the front surface of the electrode where contact with the membrane occurs. Very little of the thickness of the electrode is used because the electrolyte does not penetrate into the thickness of the electrode. State of the art solid polymer fuel cell stacks therefore utilise electrodes containing unsupported platinum black with relatively high noble metal loadings, typically 4 mg/cm$^2$ per electrode, in order to maximise the level of platinum contact at the front face of the electrode. This represents a catalyst loading about ten times higher than the catalyst loading used on the carbon-supported catalysed gas diffusion electrodes. It is believed that the amount of platinum surface utilised in these SPFC electrodes is around 3% of the total available platinum surface area on the electrode. Despite the low platinum utilisation, the performance of the state of the art SPFCs is high compared to the PAFC. Current densities of 500 mA/cm$^2$ at 0.72 V, with H$_2$/air as reactants, at a temperature of 80° C. and a pressure of 5 atm, have been reported, whereas the PAFC usually operates at only 200–300 mA/cm$^2$. However, the platinum requirement of these state of the art SPFC electrodes is close to 20 g/kW. For reasons of cost it is widely accepted that the platinum requirement needs to be reduced to levels of around 0.5 g/kW and below for the SPFC to become a viable system for applications such as transportation. Furthermore, the operating current density needs to be increased to around 2A/cm$^2$, whilst maintaining the voltage at around 0.7 V, to achieve higher power outputs.

The low utilisation of the high platinum loading electrodes, and hence the high materials cost, coupled with the fact that the power densities, although amongst the highest of any fuel cell, are still too low for the applications that are envisaged, have been the major problems associated with the production of viable membrane electrode assemblies for the SPFC. Significant increases in the effective surface area of the catalyst utilised in these electrodes will enable both performance increases and cost reductions to be attained. It should also be noted that increases in power density output can further reduce the capital cost per unit of power generated out of all proportion to the value of the catalyst per se. With the SPFC, other materials, in particular the solid polymer membrane, are also of very high cost, and improvements in cell performance will reduce the quantity of these materials required per unit of power output.

Many workers in the field have attempted to produce viable membrane electrode assemblies for the SPFC.

For example, U.S. Pat. No. 4,876,115 discloses an SPFC having electrodes which are modified versions of gas diffusion electrodes developed for the PAFC. These are formed by coating a solution of a proton conductive material over a gas diffusion electrode containing platinum loadings of around 0.5 mg/cm$^2$ of geometrical electrode area. The preferred SPFC membrane is a perfluorocarbon copolymer marketed by E I dupont, under the trade mark NAFION. Similar performance is reported for such a carbon-supported platinum electrode compared to an unsupported state of the art platinum black electrode containing more than ten times as much platinum. The similar effective platinum surface area at the interface, at these much lower platinum loadings, is due to a combination of greater utilisation of the platinum catalyst and also to the higher intrinsic surface area of the carbon supported catalysts (typically 100 $m^2/g$ Pt can be achieved) compared to the unsupported platinum black (typically around 30 $m^2/g$ Pt). Srinivasan et al ("High Energy Efficiency and High Power Density Proton Exchange Membrane Fuel Cells—Electrode Kinetics and Mass Transport", in *Space Electrochemical Research Technology* NASA Conference Publication 3125, Apr. 9–10, 1991) have estimated that the platinum utilisation in the carbon supported electrodes is still only 10%. Under similar operating conditions to the state of the art high platinum loading system, it is estimated that the platinum requirement in these electrodes is 2.5 g/kW. There is still a need for significant improvements in effective surface area of the platinum electrocatalyst both to improve performance and further reduce platinum requirements.

U.S. Pat. No. 5,084,144 discloses similar hydrogen oxidation and oxygen reduction performance from an electrode containing 0.05 $mgPt/cm^2$, in comparison with a conventional PAFC electrode containing 0.5 $mgPt/cm^2$ which has been brush-coated with NAFION. These results are attributed to a higher utilisation of the platinum.

The process by which the electrodes are produced involves fabricating a gas diffusion electrode from uncatalysed high surface area carbon black, followed by impregnation of a solution of solubilised NAFION polymer. The platinum catalyst is then applied in a subsequent stage via electrodeposition of platinum onto the preformed electrode from a platinum plating bath solution.

Even though the platinum utilisation appears to be high, the total effective surface area, and hence performance, remains similar to that of the conventional electrode because the Pt loading, of only 0.05 $mgPt/cm^2$, is very low. The process disclosed would not appear to be capable of giving sufficiently high platinum surface areas at the necessarily higher platinum loadings and may thus have practical limitations. In addition, the process itself may not readily lend itself to larger-scale commercial production.

Wilson and Gottesfeld, in *J. Electrochem. Soc.*, Vol 139, No 2, 1992, L28–30, disclose high utilisation of platinum in electrodes in which very thin films of catalyst layers are cast directly onto membrane electrolytes from inks comprising the carbon supported platinum catalyst and solubilised NAFION. Although high Pt utilisations are again reported the technique appears to be limited to ultra-low platinum loadings not exceeding 0.12 $mgPt/cm^2$, due to problems of achieving gas permeation to the active catalyst sites with thicker catalyst layers. Indeed it can be seen that at loadings greater than 0.12 $mgPt/cm^2$ no further increase in current is obtained, because active catalyst covered by a NAFION film greater than 41am thick is not utilised.

U.S. Pat. No. 4,877,694 discloses a gas diffusion electrode comprising an electrode matrix including a hydrophobic layer containing hydrophobic polymer, and a hydrophilic ingredient of particulate carbon bound by hydrophilic, halogenated polymer binder. It is stated that such electrodes may find use in applications such as for solid polymer electrolyte application and related fuel cell applications. However, the catalyst loadings employed are of the same order as in the high loading state of the art solid polymer fuel cell stacks.

For the SPFC to become a commercially viable system for the applications that are envisaged it is still necessary to develop higher performance, lower cost electrode structures in which useful platinum loadings can be applied to give increased effective platinum surface area at the interface and in which the rate of reactant gas supply is sufficiently high to enable practically useful current densities and hence cell power densities, to be attained.

SUMMARY OF THE INVENTION

An object of the present invention is to provide a high performance, lower cost membrane electrode assembly for solid polymer fuel cells, in which the porous electrodes have a relatively low platinum loading and improved platinum utilisation, and therefore higher effective platinum surface area, while demonstrating, by maintaining adequate rates of reactant gas transport, higher performance over prior art SPFC electrodes at practically useful current densities under practical operating conditions of temperature, pressure and gas flow rates.

Accordingly, this invention provides a porous electrode suitable for use in a solid polymer electrolyte fuel cell comprising a first component comprising highly dispersed precious metal catalyst on particulate carbon impregnated with proton conducting polymer, and a second component which component is a gas supplying component, comprising hydrophobic polymer with particulate carbon, characterised in that said highly dispersed precious metal catalyst is present in a precious metal loading of 0.01–1.0 $mg/cm^2$ of geometric electrode area.

This invention further provides a membrane electrode assembly containing an electrode of the present invention.

Yet further this invention provides a process for the production of an electrode suitable for use in a solid polymer electrolyte fuel cell, comprising:

i) the preparation of a first component containing highly dispersed precious metal catalyst on particulate carbon impregnated with proton conducting polymer;

ii) the preparation of a second component which component is a gas supplying component, comprising adding hydrophobic polymer to a dispersion of particulate carbon and firing, and the combination of said second component with said first component; and iii) fabrication into an electrode, characterised in that said highly dispersed precious metal catalyst is present in a precious metal loading of 0.01–1.0 $mg/cm^2$ of geometric electrode area.

BRIEF DESCRIPTION OF THE DRAWINGS

FIG. 2 is a curve showing single cell comparison of MEA's prepared from a two component cathode and a cathode fabricated by the method of U.S. Pat. No. 4,876,115.

DETAILED DESCRIPTION

Figure 1:
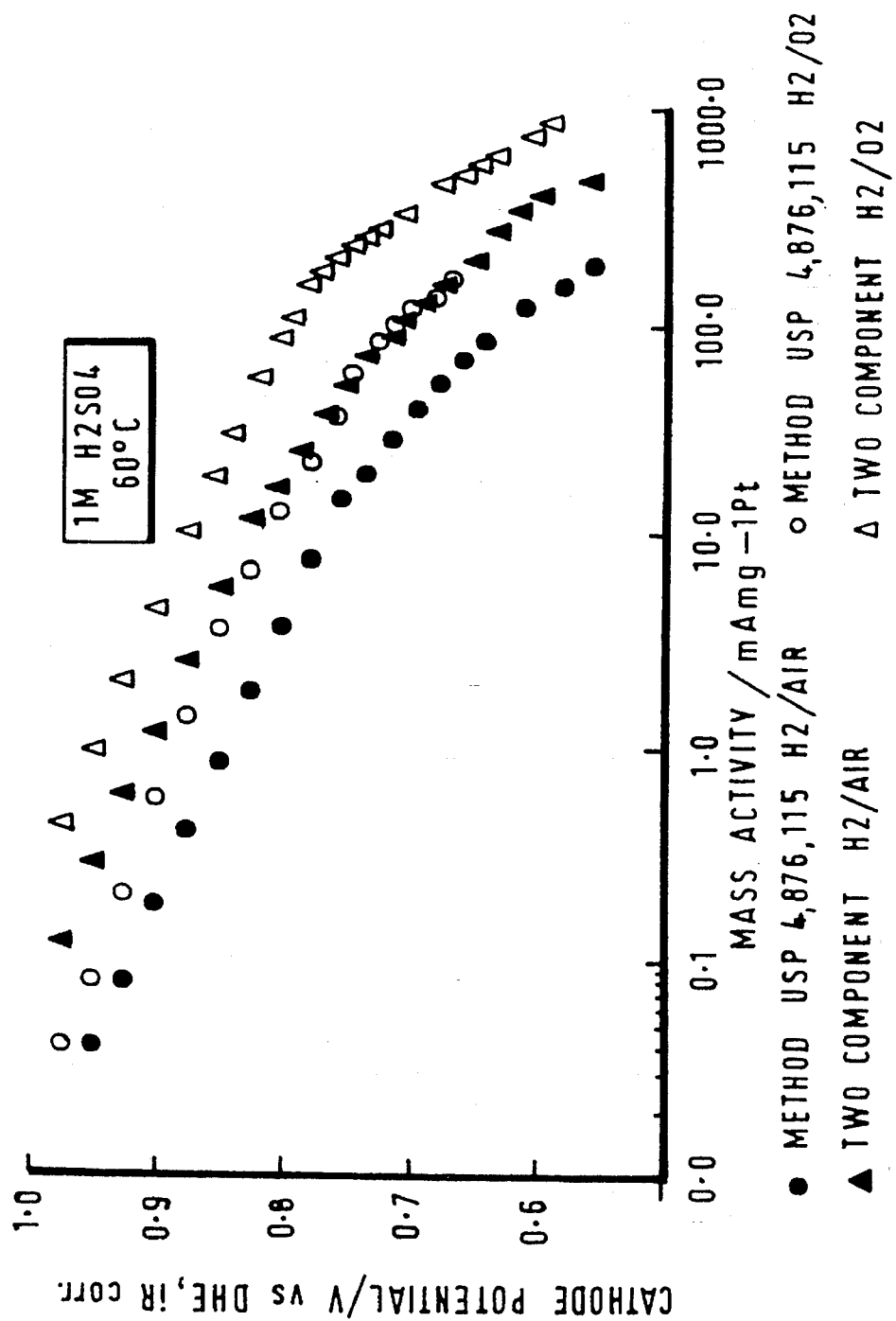
FIG. 1 is a half-cell polarisation curve showing oxygen reduction mass activity comparison of two component electrode and electrode by the method of U.S. Pat. No. 4,876,115.

The electrode of the present invention may form either the anode or the cathode. Such electrode may find use in other applications, such as in liquid electrolyte fuel cells or in other applications of solid polymer electrolyte technology such as water electrolysis, electrochemical ozone generation, or organic electrosynthesis processes.

The first and second components together form what is known as the active layer.

The first and second components serve different functions in the active layer. The first, or IONOMER component allows intimate contact between catalyst particles and the polymer membrane to be used in the fuel cell, necessary to maximise catalyst utilisation and therefore the current density obtainable at any given electrode potential. Said ionomer component comprises highly dispersed precious metal catalyst on particulate carbon impregnated with proton conducting polymer, such as the perfluoro-sulfonate ionomer produced by E I dupont de Nemours under the trademark NAFION. Any suitable precious metal catalyst may be used, for example comprising one or more platinum group metals or alloys thereof, such as platinum or an alloy thereof. Preferably the alloying components are selected from the Transition Metal elements of the Periodic Table. The active metal part of the catalyst may typically represent 10–50% by weight of the carbon-supported catalyst.

Gaseous reactant must be supplied to the ionomer component at a rate sufficient to minimise losses in current density at a given electrode potential. (Such losses are usually referred to as mass transport limitations.) Diffusion of gaseous reactant through the electrode is aided by the second, or GAS SUPPLYING component, which contains particulate carbon impregnated with a hydrophobic polymer such as polytetrafluoro-ethylene (PTFE) or ethylene-propylene copolymer (FEP) or other hydrophobic polymer.

Conveniently, the ionomer component may be prepared by first wetting the highly dispersed catalyst with the minimum quantity of demineralised water and then adding a measured quantity of iso-propyl alcohol (IPA)/demineralised water blend (90:10) with stirring. Other wetting agents may be substituted for the water/IPA mix. When the catalyst is well dispersed in the liquid medium, a measured quantity of, typically 5 wt % NAFION solution may be added with stirring. The resultant mixture may be evaporated to close to dryness, conveniently at a temperature of less than 70° C. with stirring to minimise the undesired production of thick clumps of NAFION material, and aid the formation of the desired thin, continuous NAFION film throughout the porous carbon black structure. Final drying may be performed for example at 60° C. for 24 hours followed by 4 hours at 70° C. in a vacuum over or by any other suitable means. The resultant coarse powder may be then vigorously milled to give a fine powder. Samples with polymer contents of between 5 and 60 wt % based upon dry material have been prepared. It is envisaged that this spans the useful range.

The loading of the precious metal catalyst is crucial to the power density output obtained. Optimum performance is essential to the commercial viability of the electrode, and is attained at precious metal loadings of 0.01–1.0 mg/cm$^2$ of geometric electrode area. Preferably the loading of precious metal is 0.05–1.0 mg/cm$^2$ and especially 0.05–0.5 mg/cm$^2$.

The gas supplying component may be prepared by dispersing particulate carbon in hot (80°–90° C.) demineralised water and blending using a high shear mixer. A measured quantity of hydrophobic polymer emulsion may be added to the dispersion and the mixture allowed to cool with gentle stirring until a carbon/PTFE floc settles to leave a clear colourless supernatant liquid layer. The floc may be filtered, for example through a buchner funnel, and the resultant solids dried. After drying, which may conveniently be in a vacuum oven, the rubbery material obtained may be broken down into smaller particles and fired. Firing may be carded out at a temperature of, for example, at least 280° C., for example between 300°– 400° C. but especially 320°–360° C. Firing may conveniently be carded out in a nitrogen atmosphere. To complete the preparation of the gas supplying component, the resultant solids may be cooled with liquid nitrogen during subsequent milling to produce a fine powder. It is envisaged that samples with polymer contents of between 10 and 60 wt % based upon dry material may be useful, but the preferred polymer content is between 20 and 40 wt %.

It is envisaged that mixing the ionomer and gas supplying component in ratios of between 100:0 and 50:50 respectively may be useful. To prepare the electrode, the components may be dry blended, milled together using a suitable solvent or dispersed together in a suitable liquid medium. The technique employed will very much depend upon the method employed to lay down the components onto a substrate as a uniform layer to form the required electrode. Application techniques considered relevant are those practised in the art, and include direct filtration, filter transfer, screen printing, K-bar technique and spraying. Suitable substrates include carbon paper, carbon cloth, and metal mesh. Said substrates may optionally have a backing layer of a hydrophobic carbon material. This can comprise either a high surface area, porous, particulate conductive carbon material, for example, furnace carbon blacks, or acetylene blacks, or the carbon may be mixed with a suitable hydrophobic polymer such as polytetrafluoroethylene (PTFE), or ethylene-propylene copolymer (FEP). This can be applied to the substrate by any of the methods indicated above, and heat treated at an appropriate temperature to provide the correct hydrophobic properties, prior to application of the active layer.

It may also be desirable to complete the preparation of the electrode by the application of a thin layer of a solubilised form of a proton-conducting polymer to the front face of the electrode structure.

The electrodes of the invention may be formed into the complete membrane electrode assembly by bonding of a thin film of the conducting polymer electrolyte between the front faces of two electrodes, using processes of heat and pressure, as is commonly practised in the art.

The invention will now be described by Example, which is regarded to be illustrative and not limiting. The terms "utilisation", "activity" and "performance" refer to those properties measured according to the methods contained in the following paragraphs.

"Utilisation" refers to the proportion of the total active catalyst surface area contained in the electrode structure which is in direct contact with the proton-conducting electrolyte material, and hence is capable of participating in the fuel cell reactions of oxygen reduction and hydrogen oxidation. The method used is based on that described by S. Gilman, *J Electroanal Chem*, 7, 1964, 382. The method involves the use of cyclic voltammetry to deposit and strip off a monolayer coverage of hydrogen on the active catalyst surface, in contact with the ionomer component, at potentials close to hydrogen evolution. A three-compartment glass electrochemical cell is used and 1 mol/dm$^3$ sulphuric acid, at 25° C., is used as the electrolyte to provide a source of protons to the test electrode samples. The charge associated with hydrogen adsorption is measured and using the relationship 1 cm$^2$Pt=210 μC (C=Coulomb), the electrochemical surface area of the platinum catalyst in contact with the ionomer, in terms of $m^2/g$ total Pt in the electrode is determined. Additionally, if the total surface area of the Pt catalyst on the electrode is known, then the utilisation can be determined by the ratio of the Pt area in contact with the ionomer component to the total Pt surface area on the electrode.

In terms of increased power density and reduced costs for an SPFC it is, however, a high Pt area in contact with ionomer component which is important. This may be expressed in terms of $cm^2Pt$ per $cm^2$ electrode area, which may be measured by, again, using the relationship 1 $cm^2Pt$= 210 μC.

"Activity" is a measure of the oxygen reduction ability per unit weight of the catalyst material present in the electrode structure, and is also often referred to as "mass activity". Measurements of over-voltage at various current densities are made in an electrochemical half-cell using 1 $mol/dm^3$ sulphuric acid electrolyte at 60° C., with oxygen and air as the reactants at atmospheric pressure. The current flow through the test electrode, at a series of IR (Internal Resistance) free potentials versus a dynamic hydrogen electrode (DHE), is measured, and the mass activity, expressed in terms of milliamps per milligram of the total precious metal material present in the electrode is plotted against the electrode potential. As the protons from the sulphuric acid only interact with platinum in contact with the solid ionomer component, the mass activity measurements should be strictly dependent on the utilisation.

"Performance" is a measure of the cell voltage obtained at a particular current density in a complete single cell operating under defined conditions. A single cell unit comprises an anode, a cathode and the electrolyte, together commonly referred to as the membrane electrode assembly (MEA) in the SPFC, together with provisions to provide access for the reactant hydrogen and oxygen gases to reach the anode and cathode respectively. Typically, the reactant gases, which are humidified to prevent the solid electrolyte membrane film from drying out during the measurements, are fed to the cell at pressures from atmospheric to 5 atmospheres pressure and the cell is maintained at temperatures of between 50° C. and 120° C. The current density taken from the cell is adjusted by applying a variable electrical load in controlled increments and the resulting cell voltage is measured when steady. Herein, the electrodes of the invention are evaluated as the cathode, and a standard anode, fabricated at a loading of 1.0 $mgPt/cm^2$, was used to minimise and provide constant anode voltage losses.

Initial results have been obtained with two component electrodes of the invention prepared by filter transfer and screen printing which demonstrate a Pt utilisation of 30% of an electrode with a loading of 0.54 $mgPt/cm^2$ (i.e., in terms of Pt utilised, 0.152 $mgPt/cm^2$). The platinum catalyst has a total surface area of 108 $m^2/g$ Pt, and thus the total effective platinum surface area (i.e., the surface area at the three-phase interface) is equivalent to 169 $cm^2Pt/cm^2$ electrode area. This is much improved over the current state of the art. Further half-cell studies in sulphuric acid have indicated that the increased level of utilised Pt is active for oxygen reduction, as demonstrated by a proportionate increase in current density generated by the higher Pt utilisation electrode of the invention. Furthermore, the performance data in the more realistic single cell test have also confirmed the improvement achieved with the electrodes of the invention compared with the state of the art. In particular, at high current densities, where problems associated with mass transport, specifically the diffusion of reactant gases at sufficient rates to the active catalyst sites, become more apparent, the electrodes also appear to function with improved performance compared with state of the art materials.

EXAMPLE 1

IONOMER COMPONENT

Particulate carbon sold under the trademark VULCAN XC72R, available from Cabot Corp, Billerica, Mass, U.S.A., was catalysed according to conventional method as described in EP 0512713 A1 Comparative Example A, with Pt to a loading of 20 wt %. The catalyst (2.25 g) was wetted with distilled water (5.5 $cm^3$) and IPA/distilled water blend (94 $cm^3$ of a 90:10 blend) was added with stirring. After 5 minutes 5 wt % NAFION solution was added (15.0 g) and the mixture evaporated to close to dryness at 70° C. with continued stirring. The solids were dried at 60° C. for 24 hours then finally in the vacuum oven at 70° C. to constant weight. The resultant powder was vigorously milled to give a fine crystalline powder.

GAS SUPPLYING COMPONENT

Shawinigan acetylene black, a carbon available from Chevron Chemicals, Houston, Texas, U.S.A., (1 g) was dispersed in hot (80°–90° C.) demineralised water (100 $cm^3$) and blended for 10 minutes using a high shear Silverson mixer. At 60° C., PTFE emulsion, available as a 60% solids suspension, Fluon GP1, from ICI Chemicals, Cheshire, UK, was added (0.72 g of 60 wt % emulsion to give 30 wt % PTFE in the dry sample) and the mixture stirred gently whilst cooling occurred. After 15 minutes the resultant carbon/FFFE floc was filtered in a buchner funnel and the solids dried for 4 hours at 60° C. in the vacuum oven. The mixture was then broken down using a mortar and pestle and fired at 350° C. for 16 minutes under nitrogen. A fine powder was obtained by cooling the resultant solids in liquid nitrogen and grinding in a mortar and pestle whilst the sample was still cold.

ELECTRODE PREPARATION

The ionomer component (0.230 g) and the gas supplying component (0.153 g) were blended for an hour in a mixture of IPA/demineralised water (40 $cm^3$ of IPA and 60 $cm^3$ of demineralised water) using a high shear mixer. The resultant dispersion was filtered directly onto a carbon cloth upon which a previously prepared carbon black layer had been deposited. The carbon cloth was fixed in a filter dam base (8×8 cm) on top of a fine nickel mesh and wetted with IPA. The dispersion of the active layer components were poured into the dam base and the liquid drained with a suction pump. The resultant electrode was dried in the vacuum oven at 60° C. for one hour.

The preparation of the electrode was completed by applying a coating of 5 wt % NAFION solution, using a fine brush, onto the front surface of the active layer to give ca 0.6 mg NAFION/$cm^2$ electrode dry weight. The electrode was placed on a hotplate at 60° C. during the application and was then dried at 70° C. for 2 hours in the vacuum oven to remove any remaining traces of solvent.

The electrode active layer contains a 60:40 ratio of ionomer to gas supplying component. The total surface area of the catalyst is 108 $m^2/gPt$ and the Pt loading in the electrode is 0.54 $mgPt/cm^2$ of geometric electrode area. This electrode was used for Pt utilisation and half-cell activity measurements.

EXAMPLE 2

A cathode was prepared from the ionomer component (0.171 g) and gas supplying component (0.114 g), as described in Example 1, to give a 60:40 weight ratio of the components and a total electrode platinum loading of 0.40 mg/cm$^2$.

MEA FABRICATION

Using this cathode an MEA was fabricated. The anode comprised a 20 wt % Pt catalyst supported on Vulcan XC72R carbon, at a loading of 1.0 mgPt/cm$^2$, which was brush-coated with the soluble form of NAFION polymer to a loading of ca 0.6 mgNafion/cm$^2$ of the electrode dry weight. The proton-conducting polymer membrane was an experimental membrane produced by the Dow Chemical Company, Freeport, Texas, U.S.A., and referred to as XUS-13204.10. The MEA was formed by hot pressing the front face of the anode and cathode to each side of the membrane at a temperature of 170° C. and a pressure of 100 psi, for 90 seconds, as commonly practised in the art. The membrane was cleaned prior to forming the MEA as commonly practised in the art. The MEA was evaluated in the single cell to determine the performance characteristics.

COMPARATIVE EXAMPLE 1

An electrode was prepared according to the method described in U.S. Pat. No. 4,876,115, in which the soluble NAFION polymer was applied to the front face of a preformed PAFC-type gas diffusion electrode, made with a 20 wt % Pt/XC72R catalyst with a surface area of 100 m$^2$/gPt. The electrode was fabricated with a platinum loading of 0.50 mgPt/cm$^2$.

COMPARATIVE EXAMPLE 2

A cathode was prepared as described in Comparative Example 1, but with a Pt loading of 0.40 mgPt/cm$^2$. From this cathode an MEA was fabricated as described in Example 2.

RESULTS

Utilisation

Results obtained (by the method contained hereinabove) with the two component electrode of the invention demonstrated a platinum utilisation of 30%. This is equivalent to an effective platinum surface area of 169 cm$^2$Pt/cm$^2$ electrode area. The comparative example was measured in our tests only to show 10% Pt utilisation, which is in close agreement with figures reported in the prior art. At the loading of 0.5 mgPt/cm$^2$ this corresponds to an effective platinum surface area of 48 cm$^2$Pt/cm$^2$ electrode.

Activity

Oxygen reduction activity was measured in a half-cell according to the method hereinabove. As shown in FIG. 1 the mass activity per mg Pt on the electrode, for the electrode of this invention was significantly higher than for the electrode prepared by the method of U.S. Pat. No. 4,876,115. For example, at 850 mV vs DHE, with air as the reactant, the mass activity is increased from 0.86 mA/mgPt to 5.79 mA/mgPt with the two component electrode. With oxygen as reactant the corresponding increase is from 3.65 mA/mgPt to 23.76 mA/mgPt. As can be seen the electrode structure that is the subject of this invention gives not only improved Pt utilisation, but enhanced oxygen reduction activity. This higher activity reflects the increase in the effective Pt surface area in contact with ionomer from 48 cm$^2$Pt/cm$^2$ electrode area, in the electrode of U.S. Pat. No. 4,876,115, to 169 cm$^2$Pt/cm$^2$ electrode area for the two component electrode.

The single cell performance of the two component electrode structure was superior to the performance of the state of the art electrode at all current densities, with both hydrogen/oxygen and hydrogen/air reactants, as shown in FIG. 2. For example, at a current density of 0.3 A/cm$^3$, on hydrogen/oxygen, the two component electrode exhibited a cell voltage of 0.739 volts, an increase of 95 mV on the performance of 0.644 volts obtained with the state of the art electrode. This reflects the higher effective platinum surface area of the two component electrode structure of the invention.

From the slope of the linear region of the cell voltage versus current density plots, in FIG. 2, it is evident that under the cell conditions there are insignificant mass transport losses with pure oxygen as the oxidant. The slopes of the linear regions of 0.19 $\Omega$cm$^2$ for the two component MEA and 0.17 $\Omega$cm$^2$ for the state of the art MEA are close to the slopes expected from the activation and resistive losses in the single cell. With air as the oxidant, however, there are mass transport losses, as shown by the slopes of 0.38 $\Omega$m$^2$ and 0.26 $\Omega$cm$^2$ for the state of the art and two component MEAs respectively. The lower slope for the MEA of the invention is indicative of improved rates of mass transport in the electrode structure compared with the state of the art. This highlights the useful function of the gas supplying component, in providing more efficient gas transport to the active catalyst sites.

We claim:

1. A porous electrode suitable for use in a membrane electrode assembly for solid polymer fuel cells, said electrode comprising a first component comprising a highly dispersed precious metal catalyst on particulate carbon impregnated with proton conducting polymer, said highly dispersed precious metal catalyst being present at a precious metal loading of 0.01– 1.0 mg/cm$^2$ of geometric electrode area, and a second component comprising hydrophobic polymer and a dispersion of particulate carbon, characterized in that said second component is fired at a temperature of at least 280° C. and subsequently said first and second components, are combined to form an electrode active layer, said first and second components having a uniform concentration throughout said electrode active layer.

2. A porous electrode according to claim 1, characterised in that the highly dispersed precious metal catalyst comprises one or more platinum group metals or alloys thereof.

3. A porous electrode according to claim 2, characterised in that the highly dispersed precious metal catalyst comprises platinum or an alloy thereof.

4. A porous electrode according to any of claims 1–3, characterised in that the proton conducting polymer of the first component comprises a perfluorosulphonate ionomer.

5. A porous electrode according to claim 1, characterised in that the hydrophobic polymer of the second component comprises polytetrafluoro-ethylene or ethylene-propylene copolymer.

6. A porous electrode according to claim 1, characterised in that the highly dispersed precious metal catalyst is present at a precious metal loading of 0.05–1.0 mg/cm$^2$ of geometric electrode area.

7. A porous electrode according to claim 6, characterised in that the highly dispersed precious metal catalyst is present at a precious metal loading of 0.05–0.5 mg/cm$^2$ of geometric electrode area.

8. A membrane electrode assembly containing an electrode as defined in any of claims 1–3 or 5–7.

\* \* \* \* \*

UNITED STATES PATENT AND TRADEMARK OFFICE
CERTIFICATE OF CORRECTION

PATENT NO. : 5,501,915
DATED : March 26, 1996
INVENTOR(S) : Graham A. Hards; Thomas R. Ralph It is certified that error appears in the above-indentified patent and that said Letters Patent is hereby corrected as shown below:

ABSTRACT, line 7, change "0.011-1.0 mg/cm$^2$" to
-- 0.01-1.0 mg/cm$^2$ --.
Column 3, line 2, change "E I dupont" to
-- E.I. duPont de Nemours --.
Column 3, line 60, change "41am" to --4$\mu$m --.
Column 5, line 15, change "E I dupont de Nemours" to
-- E.I. duPont de Nemours --.
Column 5, line 39, after "of" delete the comma..
Column 5, line 65, change "floe" to -- floc --.
Column 6, lines 2,5, change "carded" to -- carried --
(both occurrences).
Column 8, line 33, change "FFFE" to -- PTFE --.
Column 10, line 7, change "0.3 A/cm$^3$" to -- 0.3 A/cm$^2$ --.
Column 10, line 22, change "0.38 $\Omega$m$^2$" to -- 0.38 $\Omega$cm$^2$ --.

Signed and Sealed this

Third Day of September, 1996

BRUCE LEHMAN

Attest:

Attesting Officer     Commissioner of Patents and Trademarks